United States Patent
Sheppard

(10) Patent No.: US 6,279,593 B1
(45) Date of Patent: Aug. 28, 2001

(54) ELECTRIC STEAM TRAP SYSTEM AND METHOD OF DRAINING CONDENSATE

(76) Inventor: Hie Sheppard, P.O. Box 732, Marysville, WA (US) 98270

(*) Notice: Subject to any disclaimer, the term of this patent is extended or adjusted under 35 U.S.C. 154(b) by 0 days.

(21) Appl. No.: 09/483,152

(22) Filed: Jan. 14, 2000

Related U.S. Application Data

(60) Provisional application No. 60/116,054, filed on Jan. 15, 1999.

(51) Int. Cl.$^7$ .................................................. F16T 1/00
(52) U.S. Cl. ............................ 137/1; 137/179; 137/181; 137/187; 137/396
(58) Field of Search .................................. 137/179, 181, 137/187, 396, 1

(56) References Cited

U.S. PATENT DOCUMENTS

| | | | |
|---|---|---|---|
| 2,573,172 | 10/1951 | Ennis et al. | |
| 3,905,385 | 9/1975 | Green | 137/187 |
| 4,308,889 | 1/1982 | Lin et al. | 137/187 |
| 4,505,427 | 3/1985 | Bridges | 236/54 |
| 4,974,626 | 12/1990 | Koch | 137/187 |
| 5,244,518 | 9/1993 | Krayenhagen et al. | 156/64 |
| 5,469,879 * | 11/1995 | Rasmussen | 137/187 |
| 5,512,249 | 4/1996 | Singh | 422/114 |
| 5,531,241 | 7/1996 | Rasmussen | 137/188 |
| 5,595,211 | 1/1997 | Adams | 137/182 |
| 5,656,124 | 8/1997 | Krayenhagen et al. | 156/359 |
| 5,687,755 | 11/1997 | Farquhar et al. | 137/182 |
| 5,833,135 | 11/1998 | Yumoto | 236/58 |
| 5,857,482 | 1/1999 | Dowling | 137/312 |
| 5,884,654 | 3/1999 | Oike | 137/177 |
| 5,918,622 | 7/1999 | Perez | 137/172 |
| 5,992,436 | 11/1999 | Hellman et al. | 137/1 |

OTHER PUBLICATIONS

The Stickel, Bulletin No. 850 Stickle Steam Specialties Co. Mar., 1988.
Correspondence Hie Sheppard Feb. 15, 2000.
Correspondence Matt Kasap Jan. 13, 2000.
Micro Machinery/3/5 Ply Combined Corrugating Machine www.micromachinery.com/3–5ply.htm Dec. 13, 1999.
Steam Traps/Inspect Steam Traps for Efficient System by Alan Bandes and Bruce Gorelick www.maintenanceresourcers.com/ReferenceLibrary/SteamTraps/Inspect.htm Dec. 14, 1999.
Southern Missouri Containers, Inc., an affiliate of SMC Packaging Group www.smcpackaging.com/corrugator.htm Dec. 13, 1999.
Vinings Industries; Creating an Environment for Success www.viningsind.com/papertext.htm Dec. 10, 1999.
TLV Steam Traps www.tlv.com/english/product/straps.htm Dec. 10, 1999.

(List continued on next page.)

Primary Examiner—Gerald A. Michalsky
(74) Attorney, Agent, or Firm—Frost Brown Todd LLC

(57) ABSTRACT

A proactive electronic steam trap device, system, and method of removing condensate from a steam plant is disclosed. The device ensures a controlled drainage of condensate to maintain condensate level within a control band. The basic invention comprises and utilizes a steam trap chamber, a condensate level sensing system, a condensate level control system, and a condensate discharge system. Alternate embodiments include an air purge system, a flashing utility which permits reuse of high temperature steam, and an electronic temperature/pressure sensing device that will constantly monitor temperature and pressure variables in the individual condensate lines to verify the integrity of the individual condensate lines that are going into a single manifold of a steam trap.

39 Claims, 6 Drawing Sheets

OTHER PUBLICATIONS

Boiler www.greenhills.net/~apatter/boiler.html Dec. 10, 1999.

Good Piping Practice Prevents Water Hammer in Steam Systems www.bellgossett.com/Press/good.htm Dec. 10, 1999.

Hoffman F&T Traps Something "Extra" www.bellgossett.com/Press/extra.html Dec. 10, 1999.

Variable Volume Fundamentals; Steam Control and Condensate Drainage for Heat Exchangers Fhs.ittind.com/Press/techtk699b.htm Dec. 10, 1999.

Troubleshooting Steam Heat Exchangers and Their Systems—Part 2 Fhs.ittind.com/Press/steamheat.html Dec. 10, 1999.

The Boiler Book On–Line—Introduction to Boilers www.bhes.com/fr–bb–introduction.htm Dec. 10, 1999.

Thermodynamics of Steam; Thermodynamics of Steam Power www.greenhills.net/~apatter/pwrcycle.html Dec. 10, 1999.

TLV Hot News Page 1a; Operation of TLV's Free Float Steam Traps www.tlv.com/english/news/hotnew1a.htm Dec. 13, 1999.

TLV Hot News p. 2a; Fail–open Safety Feature www.tlv.com/english/news/hotnew2a.htm Dec. 13, 1999.

Steam Trap Surveys; Leaking Steam Traps Can Cost www.enerchecksystems.com/stemsurv.html Nov. 24, 1999.

Efficient Low pressure Steam Systems; Managing Low Pressure Steam Systems for Efficient Heating Fhs.ittind.com/Press/lowsteam.htm Nov. 23, 1999.

Steam Traps www.arctichill.com/steamtrp.htm Nov. 23, 1999.

Stickle Steam Specialties Co., Inc.; TherMiser 850 Condensate Recovery System www.sticklesteam.com/services/condensate.html Dec. 13, 1999.

* cited by examiner

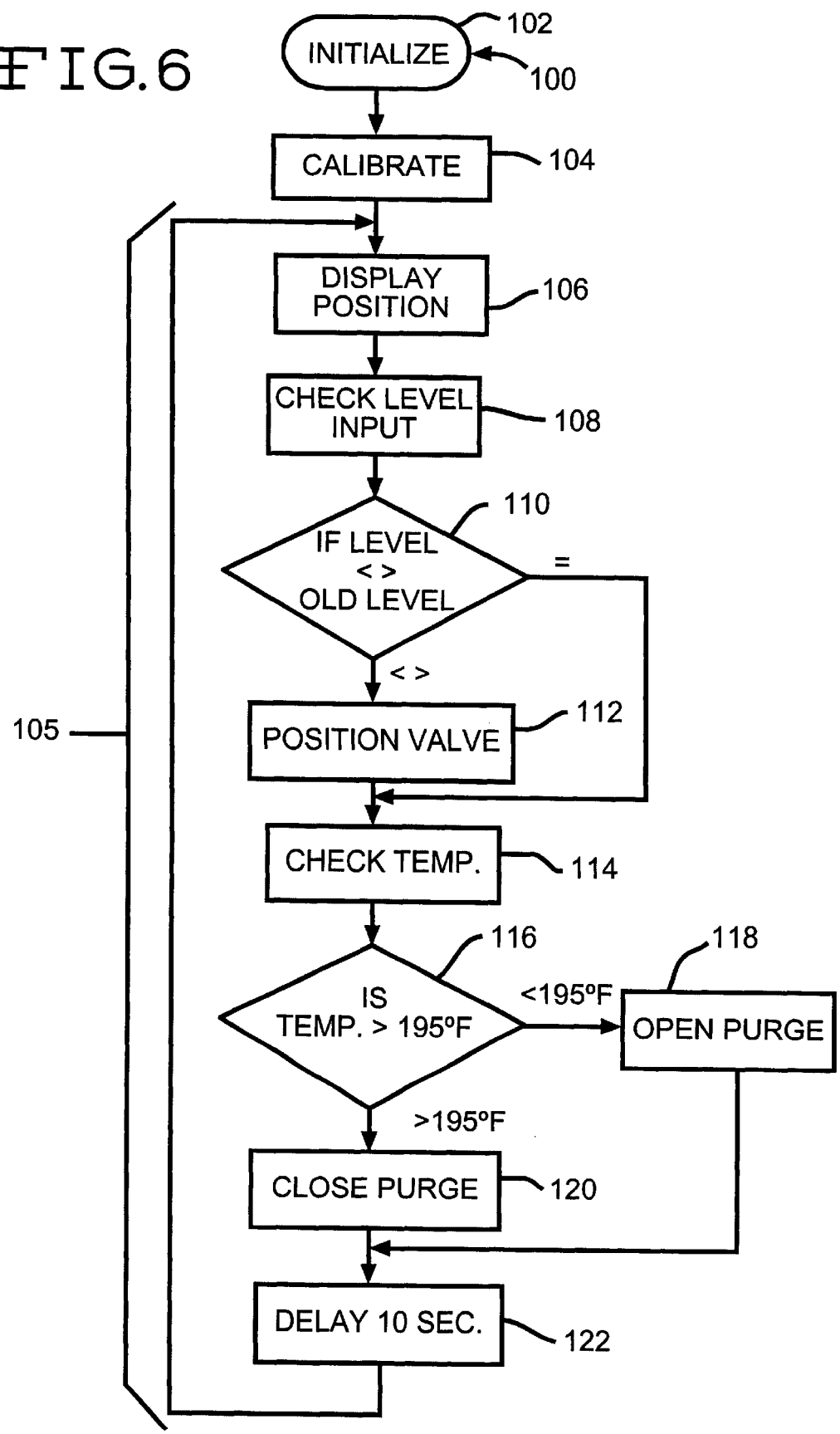

ELECTRIC STEAM TRAP SYSTEM AND METHOD OF DRAINING CONDENSATE

EARLIER-FILED PROVISIONAL APPLICATION

This is a non-provisional application based upon an earlier filed provisional application, Ser. No. 60/116,054 filed Jan. 15, 1999.

BACKGROUND OF THE INVENTION

1. Field of the Invention.

The invention relates generally to devices used to remove condensate (liquid created from the condensation of a gas or vapor) from steam lines and/or equipment or volatilized liquid lines and/or equipment, and more particularly to a steam trap system that has electronic sensors for monitoring the condensate level within the steam trap, an electronic control system for both monitoring steam trap performance as well as adjusting the opening of a condensate discharge valve to maintain condensate level within a control band, a flashing utility which permits reuse of high temperature condensate, and an electronic temperature/pressure sensing device that will constantly monitor temperature and pressure variables in the individual condensate lines to verify the integrity of the individual condensate lines that are going into a single manifold of a steam trap.

2. Description of the Related Art.

In a steam system, a boiler or steam generating unit is supplied feedwater (water which has cycled through the steam system or makeup/city water) which is heated to the saturated liquid state, vaporized to the saturated vapor state (steam), and then superheated. The steam produced may be used to transfer heat to a process. The steam leaves the boiler via the main steam line and enters the main steam header. From the main header, piping directs the steam to the steam heating equipment. As the steam performs its work in manufacturing processes, turbines, building heat, etc. (collectively, Process), the steam transfers its heat. As the steam releases this heat, it is cooled and reverts back to a liquid phase called condensate.

If condensate backs up in the steam system, much inefficiency will occur. The heat transfer rate to the Process is greatly reduced. Also, condensate backed up inside of the steam system piping cools the tubes that carry the steam to the Process. When this sub-cooled condensate is suddenly replaced by hot steam, the expansion and contraction of the tubes stress the tube joints. Constantly repeating this cycle causes premature failure. Finally, water hammer may result. Water hammer may occur where an accumulation of condensate (water) is trapped in a portion of horizontal steam piping. The velocity of the steam flowing over the condensate causes ripples in the water. Turbulence builds up until the water forms a solid mass, or slug filling the pipe. This slug of condensate can travel at the speed of the steam and will strike the first elbow in its path with a force comparable to a hammer blow. This force may be strong enough to break the pipe.

To solve these problems, steam traps have been long used in steam piping and in steam operated equipment to prevent the build-up of condensate formed by the condensation of steam in lines from the boiler. The goal of these steam traps is to drain the condensate as well as discharge air and non-condensable gases without permitting the steam to escape. If steam is allowed to escape, heat that should have been transferred to the Process will be lost. Steam traps are located after the main steam header throughout the system. Multiple pipes conducting steam to the Process may connect to a single manifold which conducts condensate to the steam trap. The condensate passes through the condensate return line and is collected and directed back to the boiler to repeat the water to steam process. Removing the condensate prevents damage to steam lines, steam turbines, steam pistons and other equipment that is operated and/or powered by the energy contained within the steam. Additionally, condensate removal, in some cases, may prevent water damage to the goods being manufactured.

Steam traps commonly used fall into four categories: mechanical steam traps, thermodynamic steam traps, thermostatic steam traps, and electronic steam traps.

Mechanical steam traps work on the principal of differentiating between the density of steam and condensate. The inverted bucket is a type of mechanical steam trap. In the mechanical steam traps, a valve opens and closes depending on the level of condensate in the steam trap bowl. For instance, in the inverted bucket steam trap, condensate enters the steam trap chamber from the bottom. As the level of condensate rises, the inverted bucket rises until it actuates a mechanical valve which allows the condensate to be blown by steam pressure into the condensate recovery lines. In the presence of steam only, the inverted bucket/float does not become buoyant, but sits securely over the orifice to close the steam trap.

The thermostatic steam traps operate by sensing the temperature of the condensate. As steam condenses, the condensate so formed is at steam temperature, but as it flows to the steam trap, it loses temperature. When the temperature has dropped to a specified value below the steam temperature, the thermostatic steam trap will open to release the condensate. For instance, this type of steam trap might have a bellows filled with a fluid that boils at steam temperature. As the fluid boils vapors expand the bellows to push the valve closed. When the temperature drops below steam temperature, the bellows contract to open the valve and discharge condensate. The bimetallic steam trap is an example of a thermostatic steam trap.

Thermodynamic steam traps operate on the principal of the difference between the flow of steam over a surface compared to the flow of condensate. Steam flowing over a surface creates a low-pressure area thus these steam traps are designed to open when the condensation of steam within the steam trap causes a change in pressure.

Electronic steam traps have also been developed to remove condensate from steam lines. Examples of electronic steam traps include Green, Rasmussen, Koch, Bridges, and Lin.

U.S. Pat. No. 3,905,385, Sep. 16, 1975 (Green) illustrates what appears to be the first use of an electronic sensor in the steam trap. Green shows the use of a condensate sensor connected directly to a condensate discharge valve. When the condensate level reaches the level of the discharge sensor, a circuit will be completed which will actuate the solenoid and open the condensate discharge valve.

U.S. Pat. No. 5,469,879, Nov. 28, 1995 (Rasmussen). This steam trap removes condensate on demand similar to a mechanical steam trap with the difference being that a electrical sensing probe extends into the condensate collection chamber and senses the high and low levels of condensate. When the condensate reaches the sensing probe an electric current causes a valve to open and the condensate is purged from the steam trap chamber. Once the condensate level falls below a preset level the valve will close until condensate again accumulates in the steam trap. This system also discloses an alarm circuit, which will indicate lack of valve opening or unusually high or low levels of condensate within the steam trap chamber.

A third example is described in U.S. Pat. No. 4,974,626, Dec. 4, 1990 (Koch). Koch discloses an electronic-controlled steam trap that also uses an electrical sensor to control a discharge valve. In addition to Rasmussen's high and low level sensors, Koch also has a timedelay circuit. The upper sensor or the high-level sensor will actuate the discharge valve. The valve will stay open until a specified time-delay after the condensate level has reached the low-level sensor. Thus, the steam trap will drain the level of condensate past the low-level sensor. The purpose of the time delay is to insure that steam trap drains completely and that the flashing of condensate within the steam trap chamber during drainage does not prevent complete drainage of the steam trap.

U.S. Pat. No. 4,505,427, Mar. 19, 1985 (Bridges) provides a fourth example of an electronic steam trap. This steam trap is designed to prevent the steam trap from becoming locked by a bubble of steam around the electronic probe. The circuit includes a timing circuit that is reset each time the valve opens. If the condensate discharge valve does not open after a predetermined time then the valve will open even if the sensor does not detect condensate. This periodic cycling of the discharge valve prevents steam locking of the valve and a build-up of condensate within the system that could damage equipment.

U.S. Pat. No. 4,308,889, Jan. 5, 1982 (Lin) illustrates a fifth electronic steam trap similar to those discussed above. The difference between Lin and the other steam traps discussed is that this steam trap adds an orifice between the probe and the discharge valve to limit the flashing of the condensate to steam when the discharge valve opens. This reduces the possibility for steam locking the probe and of receiving a false indication that the steam trap has been drained.

The general principle behind all of these different types of steam traps is the desire to limit the loss of steam and/or pressure (energy) while maintaining the steam lines and equipment free from condensate. However, the design of these steam traps causes the steam trap to cycle quite often leading to steam trap damage and failure. When a steam trap fails to properly drain, condensate remains in the steam lines and equipment and causes damage. If the steam trap falls to close, live steam enters the steam trap and there is a loss of steam pressure and heat/energy. Also, valve damage is particularly likely when the valve is in the process of closing in the presence of a mixture of condensate and steam traveling at high velocities. The high velocity water drops will result in the valve seat and valve disc being steam cut and eroded. This damage to the steam valve will ultimately require either the replacement or repair of the valve disc and the valve seat. This results in a reduction in the operating efficiency for the steam plant.

The constant cycling of these steam traps causes the steam pressure on the steam plant equipment to also cycle. This cycling pressure is suspected to reduce the life expectancy of siphon pipes used to remove condensate from some steam equipment. Rotary joint siphon tubes employed to remove condensate from dryer drums used in paper and box plants appear to be the most susceptible to damage.

Another drawback to these steam traps is the phenomenon of condensate flashing. Condensate flashing occurs when there is a decrease in pressure in very hot condensate. The steam system produces superheated steam. This is possible because the saturation temperature or boiling point of water is a function of pressure and this temperature rises when pressure increases. When water under pressure is heated its saturation pressure rises above 212 degrees F in the boiler. To illustrate, one pound of water at 70 degrees will remain water at 0 pounds per square inch (PSI). But 1 pound of water may be heated to 338 degrees F at 100 PSI before it will change from water to steam. This allows the steam to be superheated. Therefore, when very hot condensate is released from the steam trap into a lower pressure environment, the saturation temperature will lower correspondingly. This may cause the condensate to "flash" into steam which is then dissipated throughout the system. Besides the inefficiency of not utilizing the energy released by this phenomenon, flashing may cause a second form of water hammer in the steam system. This type of water hammer is called cavitation. Cavitation is caused by a steam bubble forming or being pushed into an area completely filled with water. When high temperature condensate flashes upon leaving the steam trap, such steam bubbles may form. As these steam bubbles are pushed into colder condensate in the return piping, the trapped steam bubbles will lose their latent heat and the bubble will implode. As the bubble implodes, the wall of water comes back together and the force created can be severe. This condition can damage piping and potentially damage the steam trap itself. The most common method of dealing with this phenomenon is to install a flash tank where the condensate is being discharged into the return condensate line. This holding tank allows the condensate to flash without releasing air bubbles into the condensate return line. The steam produced in this flash tank merely dissipates into the steam system. Therefore these steam traps do not utilize the energy contained in the flash steam. The steam traps described above, merely return the condensate to the condensate return line where the continually cooling condensate is directed back to the boiler to repeat the water to steam process. En route to the boiler, condensate loses even more heat which simply dissipates into the system.

The disadvantage to this loss of energy may be illustrated by describing the use of a steam system to power a corrugated cardboard plant. Corrugated paperboard is manufactured at high production rates on corrugator machines that are well known in the paper industry. The corrugator machine unwinds two continuous sheets of board from rolls; these sheets are softened/conditioned by steam at 135 PSI by a high-pressure condensate pump. The corrugator machine then presses flutes into the sheet of corrugated medium, applies glue to the tips of the flutes and then adds a third sheet of linerboard to form corrugated board. The combination of these sheets is called the web. To complete the formation of corrugated board, the adhesive is cooked/cured by passing the freshly glued web across a series of hot plates under pressure from above. The hot plates may be heated internally by steam to a temperature necessary to cure the adhesive. Pressure is provided by moving the web over the hot plates under a belt which rests upon the web and advances with the web at the same speed. Weight rollers on top of the belt provide additional pressure to hold the web together and maintain them flat against the hot plates to enhance heat transfer from the hot plates to the web for the curing process. As the heat acts upon the adhesive, it also drives moisture out of the web so that the finished corrugated paperboard will exit the heating section in a stiffened, substantially flat condition. The web then passes immediately through a cooling section to reduce its temperature prior to cutting the board.

The process of curing adhesive in the web may cause warping, cracking, or crushing of the board due to a combination of the high temperature of the hot plates, uneven moisture contained in the web, pressure provided by the weighted belt above the web, and the sudden cool-down process. Thus, it is necessary to reduce the temperature of the hotplate section. In order to reduce the temperature of the hotplates, the steam must be reduced to a lower saturated pressure and temperature. One way in which this is accomplished is by using a pressure reducing valve and a desuperheater station which sprays condensate into the reduced pressure steam to bring it back to a saturated condition. U.S. Pat. 5,656,124 suggests another means of alleviating this problem by providing an improved hot plate section utilizing a steam manifold having multiple valves allowing the operator to vary the pressure and therefore the steam temperature applied across the moving web. By varying the temperature of the steam, an optimum temperature for heating the web may be achieved that will not result in warping, cracking, or crushing the web. The need for varying steam temperatures in this industry indicates a potential use for heat contained in return condensate if such heat could be harnessed and re-introduced to the system.

Another drawback to the use of steam traps is that air and other noncondensible gases leak into the steam trap chamber when the steam is shut off and the steam system cools down. Steam is contaminated with a small amount of carbon dioxide gas when it leaves the boiler and air is drawn into steam heating equipment through rotary joints and valve packing glands. When steam inside the steam system condenses into water and is drained out through the steam trap, it creates a vacuum inside the heating equipment which is filled with air and other noncondensable ad gases. Neither air nor carbon dioxide condense, therefore, they must be pushed out of the steam system by the steam when the heating equipment is put in service again. If the air and noncondensable gases are not forced out of the system, a good heat exchange cannot take place. For instance, in a cascade type steam system, warm-up steam from the main steam header is admitted to the first steam user unit, the air in this unit must be forced out to the second unit. Once the first unit is warmed up, the warm-up steam is admitted to the second unit which eventually forces the air out of this unit into a third unit. This continues until all of the air is pushed back into the boiler tank which ultimately results in more residue in the boiler tank that must be removed during a system blow-down. Furthermore, if air/noncondensable gases are trapped within the steam trap, erroneous readings may result. Prior art traps accomplish this air purge via a very small orifice in the top of the steam trap. The slow warm-up procedure necessary in steam systems, to prevent shocking the metal pipes, and the fact that steam pressure in the steam system must increase enough to push the air out of the orifice in the steam traps and back to the boiler room results in a less efficient system.

Therefore, there is a need for a steam trap that limits the cycling of the steam trap and thereby extends the steam trap life. There is further need for a steam trap that will control condensate flash to prevent water hammer from damaging the steam system while utilizing the heat contained in condensate to provide further power to the Process. There is a need for a steam trap that can efficiently discharge air and other noncondensable gases. Finally, there is also a need to monitor a steam system in which multiple condensate lines feed into a steam trap. If one of the lines is damaged, the resulting loss of pressure and loss of heat will render the entire system more inefficient. Currently, there is no way to identify which of the several lines is adversely impacting the system as a whole.

SUMMARY OF THE INVENTION

The present invention addresses the problems with the previously described mechanical and electronic steam traps. In particular, it addresses the problems regarding the flashing of condensate within the steam trap chamber upon discharge of condensate, the resulting inefficiency from the flashing of discharged condensate, the 'wear and tear' on the steam trap cycling from closed to open, inefficiencies resulting from air and noncondensable gases being trapped in the steam system, inefficiency resulting from not utilizing heat contained in drained condensate, and inefficiencies resulting from damaged pipes feeding into the steam trap.

The present invention is an electronic steam trap system and method of draining condensate that comprises an electronic steam trap and may, optionally, include some combination of the following: an air purge system, a flash tank system, and/or a line monitoring system. The electronic steam trap includes a steam trap chamber, a condensate level sensor system, a condensate level control system, and a condensate discharge system. The electronic steam trap systems act to maintain a substantially stable condensate level in the steam trap chamber.

The electronic steam trap typically stores condensate in its steam trap chamber. The electronic steam trap's condensate level sensor system measures the level of condensate in the steam trap chamber and relays this information to the condensate level control system. The condensate level control system calculates a rate of discharge based upon either the input received from the condensate level sensor system or according to condensate control program and communicates with the condensate discharge system. The condensate discharge system, receives output from the condensate level control system which controls the actuation of various valves to achieve a controlled rate of discharge such that the condensate level within the steam trap chamber remains within a predetermined level control range.

The condensate level sensor system should be capable of sensing at least three different condensate levels: a high-level, a mid-level, and a low level. The condensate sensors typically are located within the steam trap chamber, protected by a splash shield, or in an external standpipe. Optionally, the electronic steam trap may contain an alarm system. The sensory system may contain a high level sensor and a low-level sensor which are typically placed above and below the previously mentioned sensors. Either sensor, when activated, triggers an alarm in the case of a malfunction of any of the aforementioned systems. Also, each sensor, when activated, will cause a light positioned on the outside of the steam trap to light up in case the alarm system malfunctions. This way, the trap can be manually evaluated and manually opened/closed if needed.

The condensate level control system is designed to maintain "a substantially stable condensate level" in the steam trap chamber. Typically, the substantially stable level is a condensate level maintained between about forty percent (40%) and about sixty percent (60%) of the volume of the steam trap chamber. Alternatively, in some embodiments the range for a relativity stable level may be broader. This substantially stable level is the control band for the steam trap.

A substantially stable level of condensate inside the steam trap chamber reduces damage to the discharge valve through repeated cycling from open to shut. Additionally, steam cutting (high-pressure flash steam escaping through a nearly closed outlet valve which causes gouging of cutting of the valve seat) of the discharge valve is also reduced since the maintenance of a substantially steady condensate level within the steam trap chamber acts to insure that predominantly condensate will be present at the discharge valve. Additionally, a substantially steady valve position and steady condensate flow reduce the pressure fluctuations in the steam trap and the steam system, thus limiting cycling pressures in the steam equipment.

The condensate level sensing system communicates with a condensate level control system. The condensate level control system calculates the rate of discharge necessary to maintain a substantially stable level of condensate within the steam trap. Additionally, there may be provided a means for connecting the condensate level control system to a personal computer or with the steam plant mainframe computer. With either computer receiving inputs about the steam load and manufacturing processes, the computer could calculate a substantially steady condensate control level to account for the expected condensate levels. This adjustment would allow the steam trap discharge valve to be positioned to anticipate changes in steam load as they occur in a proactive manner rather than reacting to the condensate level within the steam trap. The condensate level sensing system would provide a backup or override to the proactive commands of the condensate level control system.

The condensate level control system communicates with the condensate discharge system to actuate valves which will allow the steam trap to drain into condensate return lines which feed back into the boiler.

Optionally, the proactive steam trap may contain an air purge system that reduces the amount of air and non-condensable gases contained within the steam trap chamber. This air purge system may enable the steam trap chamber to remain free of gas that might cause an air bubble to form and result in erroneous readings by the electronic condensate sensing system. It also enables a better exchange of heat in the steam system. Pipes in a steam system must be heated slowly to prevent thermal shocking of metal parts and to limit water hammer in the condensate return lines. Because air and non-condensable gases are good insulators, the presence of these entities in the steam system slow down an even heat-up of the system.

The air purge system typically employs a temperature monitor, an air purge valve actuator, a main air purge valve, and a needle air purge valve. The air purge system functions in two ways. Upon startup of the steam plant, the main air purge valve opens to discharge any air contained in the steam trap chamber before any condensate has formed. Once the steam pipes and/or equipment warm up to a predetermined temperature, a temperature control causes the main air purge valve to completely shut. The steam trap chamber will then be ready to receive condensate from the steam piping or steam equipment. Condensate, however, may be contaminated with small quantities of noncondensable gases that should be removed from the steam trap. Therefore a second air purge valve, which remains open at a predetermined level, allows the removal of these noncondensable gases by bleeding off a small amount of steam from the top of the steam trap.

The air purge system results in faster warm-up time using less energy and more uniform equipment temperatures thus allowing faster speeds at start up. Also, the removal of air and non-condensable gases at their source avoids corrosion of condensate return lines and helps prevent dissolved oxygen from entering the boiler, thus reducing the amount of chemicals (oxygen scavengers) needed. This, in turn, reduces the amount of total solids entering the boiler, thus reducing boiler blow down and allowing the steam system to remain operational for longer periods of time.

The steam trap may also include a flash tank. The combination electronic flash tank/steam trap contains a flash tank and a steam trap that receives high-pressure saturated steam and flashes to a lower pressure saturated steam providing a source of heat energy at lower pressures and temperatures. Condensate from a steam user is exhausted at, for example, 135 PSI and enters the flash tank/steam trap combination. A pressure control valve located at the top of the flash tank may be actuated to cause a pressure drop in the steam trap. This action allows a pressure drop in the steam trap causing a portion of the heat energy in the 135 PSI condensate to flash to steam at a lower saturated pressure and temperature. The steam trap then electronically discharges the steam to another Process at, for example, 40 PSI. The condensate level sensing system controls the liquid level in the flash tank/steam trap combination and, by communicating with the condensate level control system and condensate discharge system, maintains a reservoir in the lower part of the body preventing steam from escaping through the condensate discharge control valve. The utility of this lower temperature steam may be particularly seen by referring to the corrugated cardboard plant example described in the Background section. In a corrugated cardboard plant powered by steam, prior art disclosed that by varying the temperature of the steam, an optimum temperature for heating the web may be achieved that will not result in warping, cracking, or crushing the web. The electronic flash tank steam trap provides a source of lower temperature steam without using a desuperheater or the manifold assembly described by U.S. Pat. No. 5,656,124. Furthermore, by using a common steam supply line for high and low pressure saturated steam, operators may then select any desired combination of steam pressure to the hot plate section through the use of valves. This ultimately enables the operators to select the most efficient and best quality conditions for each grade of paper used in the corrugating process by selecting the settings on a computer in the control room. The utilization of the extra heat contained in the condensate is most useful in the newer steam systems which have higher machine speeds and therefore require more energy to be delivered to all steam user components.

Finally, there may be provided a means for monitoring separate steam lines feeding into a single electronic steam trap. An electronic temperature/pressure sensing device will constantly monitor temperature and pressure variables in the individual condensate lines. This device should be programmed to send a signal to a microprocessor, perhaps the same personal computer or the steam plant mainframe computer used by the condensate level control system. With either computer receiving inputs about the integrity of the steam lines, the computer can be easily programmed to determine whether the steam plant is operating at maximum efficiency by comparing the inputs with preset limits and, if not, actuate an alarm identifying the affected line. Thus, a team may be quickly dispatched to fix the damaged line. By pinpointing which line is damaged, the monitoring system will result in less downtown for the plant and ensure a return to maximum efficiency as soon as possible.

These and further objects of the present invention will become more apparent from the following description of the preferred embodiment.

BRIEF DESCRIPTION OF THE DRAWINGS

The accompanying drawings incorporated in and forming part of the specification illustrate several aspects of the present invention. In the drawings:

FIG. 6 is a logic flow diagram for a control program for the level monitoring and control system.

For the purpose of promoting an understanding of the principles of the invention, reference will now be made in detail to the present preferred embodiment to the invention, examples of which are illustrated in the accompanying drawings and specific language will be used to describe the same. It will nevertheless be understood that no limitation of the scope of the invention is thereby intended toward such alterations and further modifications in the illustrated device and such further applications of the principles of the invention as illustrated therein as would normally occur to one skilled in the art to which the invention relates.

DETAILED DESCRIPTION OF THE PREFERRED EMBODIMENT

FIGS. 1–6 illustrate several embodiments of an electronic steam trap system in accordance with the present invention. The steam trap system consists of a steam trap and preferably includes at least one of the following: an air purge system, a flash tank system, and/or a line monitoring system.

Figure 1:
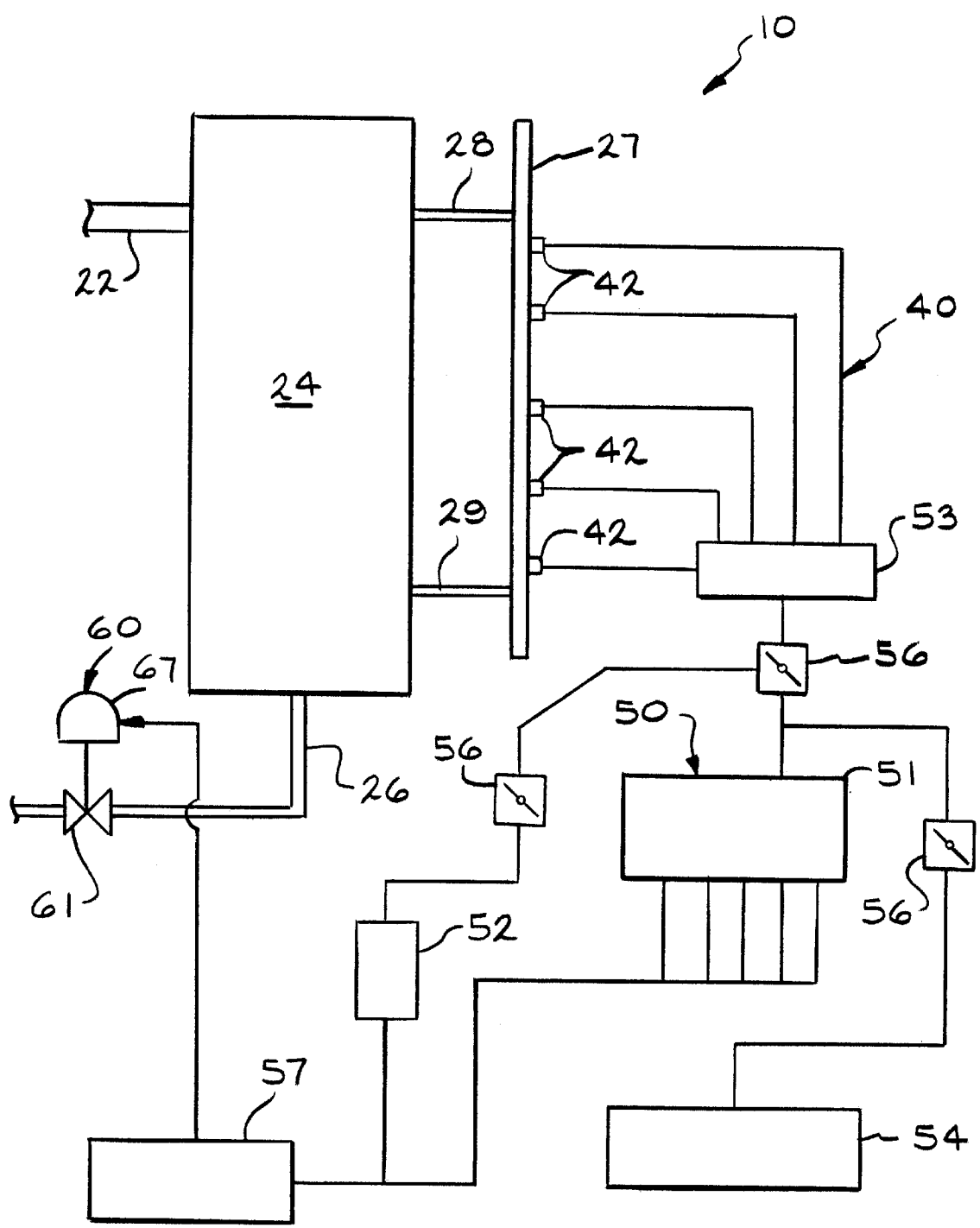
FIG. 1 is a functional diagram of an electronic steam trap in accordance with the present invention.

In FIG. 1, the proactive electronic steam trap 10 typically has a steam trap chamber 24 for storing condensate; a condensate level sensor system 40 that monitors the condensate level in the steam trap chamber; a condensate discharge system 60 that controls the condensate discharge; and a condensate level control system 50 that converts the output of the sensor system into a signal that causes the valve controller to properly position the discharge valve and thus control the rate of condensate discharge.

Figure 4:
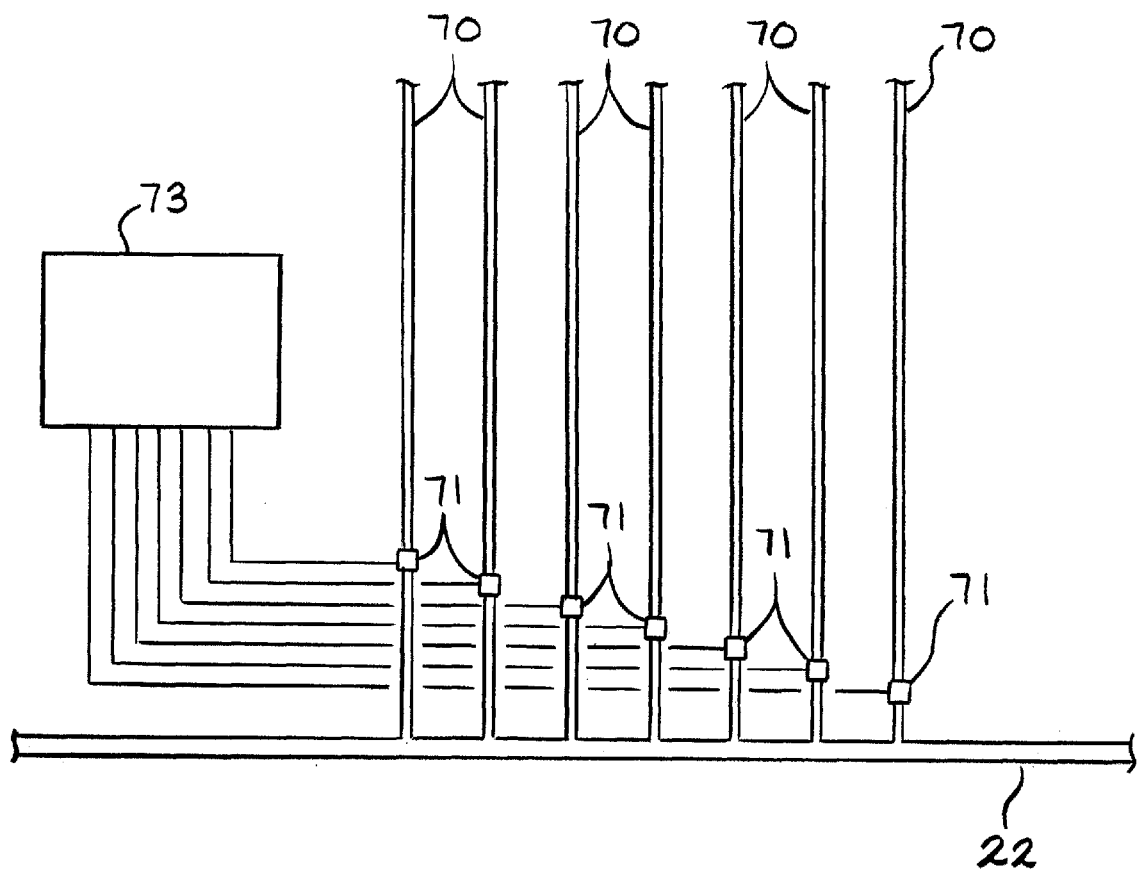
FIG. 4 is a functional diagram of a fourth embodiment of the electronic steam trap shown in FIG. 1 incorporating a line monitoring system.

The steam trap chamber 24 collects the condensate from one or more points along a steam pipe or steam operated machinery. FIG. 4 illustrates multiple steam pipes 70 feeding into an inlet pipe 22. FIG. 1 illustrates inlet pipe 22 feeding into steam trap chamber 24. Typically, when multiple drain points 70 (FIG. 4) are connected to a single manifold which drains into steam trap 10, each drain point is at approximately the same steam pressure to prevent steam flow through the condensate inlet piping. Thus, the steam trap chamber 24 acts as a reservoir to store condensed steam in a body separate from the steam pipes and equipment of the steam plant. Typically, chamber 24 has an inlet 22 and an outlet 26. The inlet 22 is typically connected near the top or upper end of the steam trap chamber 24, but may be connected to other positions in the steam trap chamber 24. In some embodiments, a single opening may serve as both an inlet and an outlet for the condensate stored within chamber 24. The inlet 22 and outlet 26 are typically welded to the steam trap chamber 24, but may be connected to the steam trap chamber 24 by other means, such as, but not limited to, a threaded or brazed connection, provided that the connection has sufficient strength for the pressure that the steam trap 10 is subjected to. The materials and construction of steam piping is well within the scope of the prior art. The preferred material is steel; however, any material with sufficient strength and durability for use in steam of volatilized liquid systems may be utilized.

Figure 2:
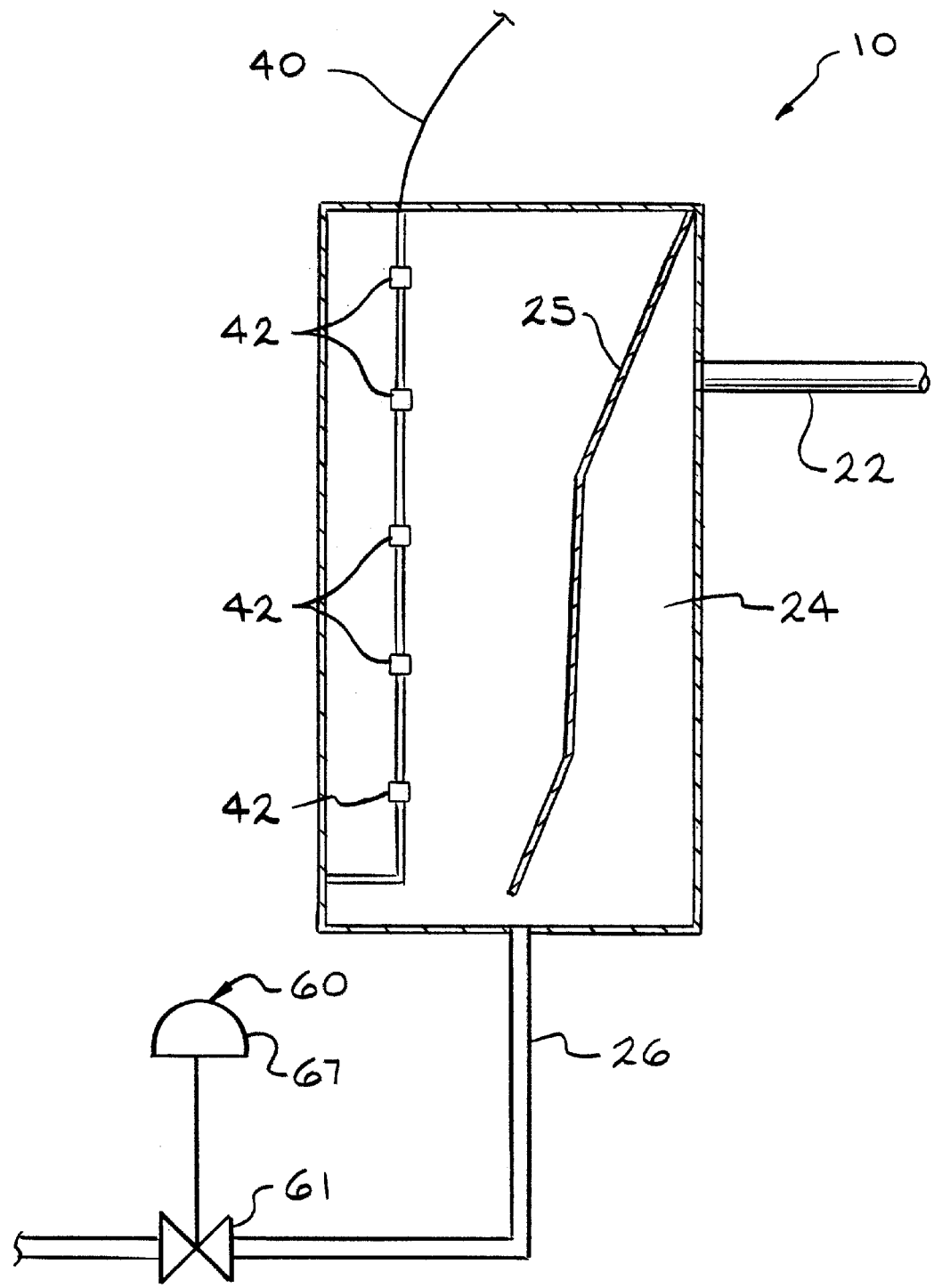
FIG. 2 is a functional diagram of a second embodiment of the electronic steam trap shown in FIG. 1.

A sensor system 40 monitors the level of condensate in the steam trap chamber 24. When the sensors 42 comprising the sensor system 40 reside inside steam trap chamber 24, as shown in FIG. 2 additional piping would not typically be required. To prevent erroneous sensor readings with the sensors 42 inside steam trap chamber 24, a splash shield 25 may be mounted in steam trap chamber 24 to protect sensors 42 from incoming condensate. The splash shield could be made of metal or some other protective substance and prevents the condensate level sensors 42 from generating too many false signals from splashing condensate.

The shield should be open at the bottom to allow condensate to enter but have small openings, possibly provided by stitch welding, at the top or along the side(s) to provide a vent path for any air or other noncondensable gases which collect in the steam trap. The vent path will prevent erroneously low readings due to an air/gas bubble being trapped under the splash shield.

Referring again to FIG. 1, if the sensors 42 are located outside steam trap chamber 24 and require contact with the condensate, then a standpipe 27 may be connected to chamber 24 with an upper pipe 28 and a lower pipe 29. Mounting sensors 42 in standpipe 27 may permit easier maintenance and repair of sensors 42 as well as separating the sensors from the bulk of the condensate contained in steam trap chamber 24. This separation helps minimize erroneous level signals.

Typically, condensate level sensing system 40 has at least three sensors 42, with at least five sensors 42 being preferred. The spacing between adjacent sensors 42 may vary, however it is preferred that this spacing be approximately the same distance. The number of sensors 42 and the distance between sensors 42 typically determines the maximum condensate level control range. The larger the number of sensors 42 and the smaller the distance between the sensors 42 the finer the level control may be. Sensor 42 may be any device that can output an electrical signal that indicates condensate level or indicates the presence or absence of condensate at the location of the sensor. These sensors 42 include but are not limited to, conductivity sensors, ultra sonic level sensors, or electromagnetic sensors (reed switches, radar level detectors, laser detectors, etc.). Typically, each sensor 42 in sensor system 40 communicates with the condensate level control system 50.

Preferably the condensate level sensing system 40 employs sensors 42 that are vertically arranged. The sensors 42 are typically conductivity sensors that communicate the level of condensate by completing an electrical circuit between the body of steam trap 24 and the condensate level sensor 42 (via the conductivity of the condensate) when condensate rises to the level of a particular condensate level sensor 42. As the condensate level decreases and falls below the level of a particular condensate level sensor 42, the electrical circuit connection will be broken. Upon completion of an individual sensor circuit, the condensate level sensor 42 sends a signal to the condensate level control system 50.

An optional level alarm system may be implemented by installing one or two additional sensors 42. A high level sensor could be located above the uppermost level sensor and a low-level sensor may be located below the lowermost level sensor. These high and low level alarm sensors 42 would actuate an alarm by sending a signal to the condensate level control system 50 that could warn the operator of a malfunction in the steam trap. Preferably the high and low sensors selected would be similar to the level sensors 42. The preferred embodiment would also include a manual backup consisting of an arrangement of lights (not shown) on the outside of the steam trap which would light up upon activation by the rising condensate and turn off as condensate drains from the steam trap 10. This would allow an operator to manually evaluate whether the steam trap should be open or closed in the event of an alarm (or other) system malfunction.

When conductivity sensors are utilized for sensors 42 and a programmable logic controller (PLC) 51 is employed as part of the control system 50 an amplifier 53 may be required to boost the output of sensors 42 to a level that may be effectively utilized by the PLC 51 or PC 52 selected.

The condensate level control system 50 receives, interprets, and responds to input generated by the condensate sensor system 40. The condensate level control system 50 provides an output to the condensate discharge system 60. The actual components and control logic selected for the condensate level control system 50 will depend on the type of sensor(s) 42 used and the components selected for the condensate discharge system 60. The design of the particular condensate level control system 50 employed is within the ordinary skill in the art. Preferably, the condensate level control system 50 has a programmable logic controller (PLC) 51 and/or a personal computer (PC) 52 and/or mainframe 54, and a valve controller 57 as can be seen by reference to FIG. 1.

The PLC 51, a non-limiting example of which is the SLC 500 processors manufactured by Automation Systems, is capable of both sending and receiving information. The means for computing may comprise, but is not limited to, a PLC 51, PC 52, and/or a mainframe computer 54. The means for computing receive, as input, a condensate level signal generated by the condensate sensors 42. The means for computing interpret the sensory input and return, as output to the valve controller 57, the adjustments that the condensate discharge system 60 must make to affect a controlled rate of drainage of the condensate accumulating in the steam trap chamber 24. The means for computing may also calculate anticipated adjustments to the condensate discharge system 60 based on the data received from the condensate level sensing system. This allows the steam trap to act proactively rather than responsively. The means for computing may also run a pre-designed steam trap program. Using a pre-designed steam trap program will allow the condensate level control system to proactively rather than responsively control the condensate discharge system.

The means for computing which is running a steam trap program 100 (FIG. 4) would control the operation of the condensate discharge system 60. This program 100 may utilize data originating at sensors 42 alone and/or information collected from the mainframe 54. The mainframe data may be derived from information such as, but not limited to, the steam load on the system, the production line, and the manufacturing process in use. For example, in the cardboard box industry, the same production facility is used to make many different styles, thicknesses, sizes, and weights of cardboard. The style, thickness, size and weight of the cardboard are factors which determine steam plant load, as well as how much condensate will be generated in the steam traps. By proactively adjusting the condensate discharge system 60, the system may run more efficiently and require fewer overall adjustments due to changes in the condensate level within the steam trap chamber 24, as would be the case if the condensate level control system 50 was reacting to current sensory input alone. Alternatively, the data may be employed to shift the center point of the condensate level control band or to change the width of the control band. Changing these level control parameters increases the flexibility of the control system and is expected to improve steam plant efficiency.

Adjustments generated by the controlling system 50 are communicated to the condensate discharge system 60. The discharge system 60 has a valve actuator 67 and an adjustable condensate discharge valve 61. The condensate discharge system 60 is should be preferably, but not necessarily, positioned at the bottom of the steam trap chamber 24.

Typically, the condensate level control system 50, using the condensate discharge valve actuator 67, determines the degree to which the condensate discharge valve 61 should be opened or closed. The condensate discharge valve actuator 67 may be an electric motor which positions the condensate discharge valve 61. Condensate discharge valve 61 should be a valve capable of multiple levels of adjustment, such as, but not limited to, a throttle valve, and should be capable of at least three, but preferably five or more, levels of adjustment. The adjustment of the condensate discharge valve 61 may correspond directly with the level of condensate currently present within the steam trap chamber 24. Upon the opening of the condensate discharge valve 61, condensate drains at a controlled rate from the steam trap chamber 24 to be returned to a condenser, a boiler, or other condensate storage device.

Figure 3:
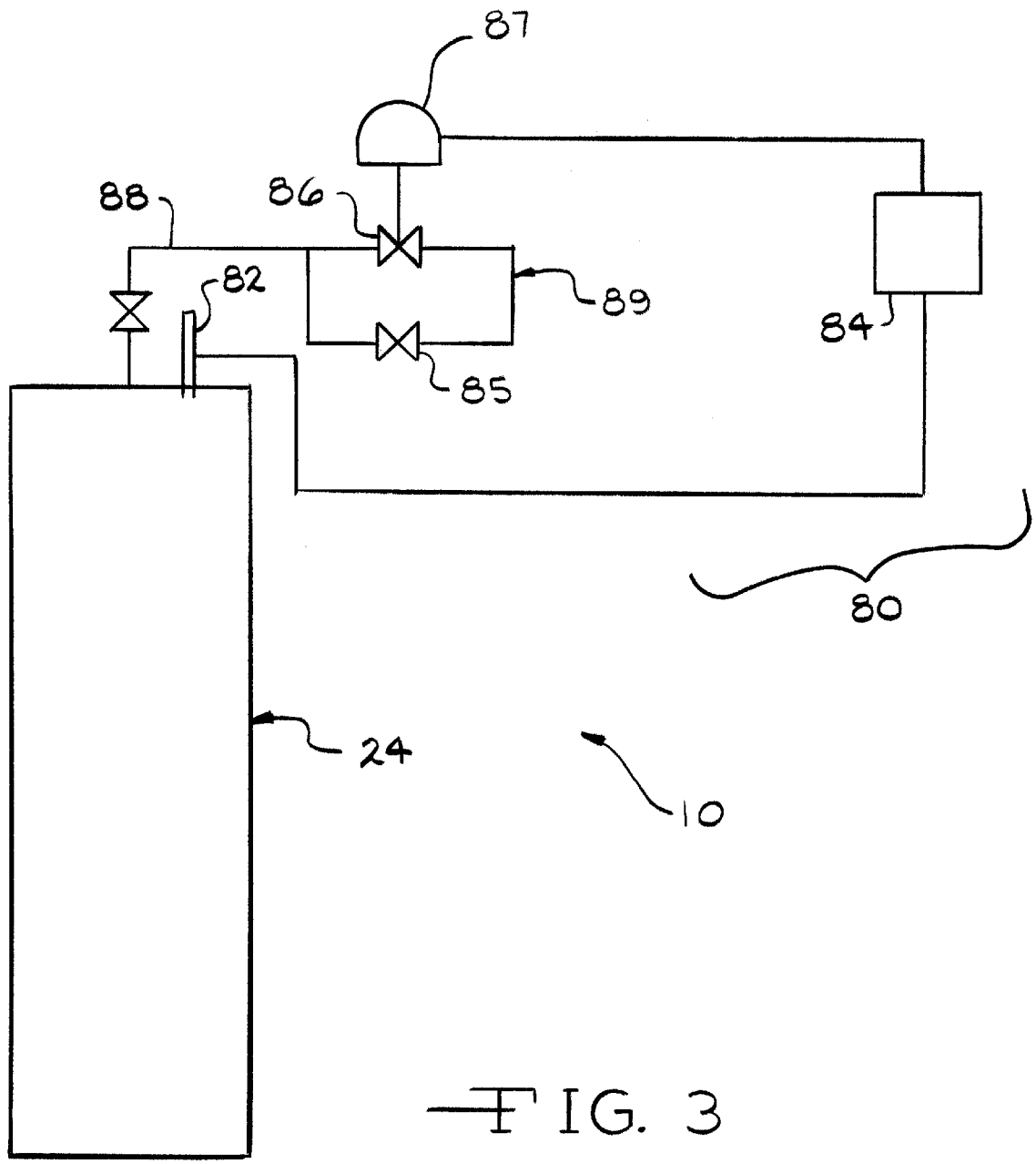
FIG. 3 is a functional diagram of a third embodiment of the electronic steam trap shown in FIG. 1 incorporating an air purge system.

FIG. 3 illustrates an optional air purge system 80. Preferably, this system is positioned at the top of the steam trap chamber 24. The air purge system 80 has a temperature sensor 82, a control circuit 84, an air purge valve actuator 87, a main air purge valve 86, an needle valve 85, and two air/non-condensable gas discharge pipes 88 & 89. Preferably, the control circuit 84 would be included in the condensate level control system 50, typically in PLC 51. The air/non-condensable gas discharge pipes 88 & 89 are connected to the steam trap chamber 24 in the same manner (typically but not limited to welding) as inlet pipe 22. In air/non-condensable gas purge line 89, there is a needle valve 85 which is adjusted to provide a small but continuous purge of air and other non-condensable gases from the top of steam trap chamber 24. This valve 85 will typically be throttled so that it has only a very small opening to limit the loss of steam and steam pressure from the steam system.

Typically this system would be designed so that upon startup of the steam plant, the temperature sensor 82 will relay the temperature of the piping to a temperature control circuit 84. An Ogden Model ETR - 9090 Microprocessor may be used for the temperature control circuit 84. If the temperature is less than a predetermined temperature, for example, approximately 195° F.±25° F. for steam, the temperature control circuit 84 activates an air purge valve actuator 87, by relaying a 120 volt current, for the air/non-condensable gas discharge valve 86 which completely opens the air/non-condensable gas discharge valve 86 and discharges any gas contained in the steam trap chamber 24 to the atmosphere or a collection system. A Neles Jamesburt ball valve with a Neles Jamesbury electrically operated actuator may be used for the air/non-condensable discharge valve 86 commonly referred to as an air purge throttle valve. This operation typically occurs before any condensate is collected within the steam trap chamber 24. Once the steam plant pipes warm up and the temperature sensor 82 detects a temperature above the predetermined set point, perhaps 205° F., the temperature control circuit 84 typically turns off the power source to the air purge valve actuator 87 to completely shut valve 86. The steam trap chamber 24 will then be ready to receive condensate from the steam piping or steam equipment. Therefore, a second air purge valve 85, which remains open at a predetermined level, will allow for the removal of any noncondensable gases contaminating the condensate by bleeding off a small amount of steam from the top of the steam trap chamber 24. The second air purge valve may be a needle valve or a throttle valve.

An alternative embodiment for the air/non-condensable gas discharge system 80 could employ a throttle valve as discharge valve 86. Valve 86 could then be adjusted based upon the temperature of the piping in the steam system. For example, below approximately 200° F., the air/non-condensable gas discharge valve 86 could be set to full open. Above approximately 205° F., the air/non-condensable gas discharge valve 86 could be set to a minute opening to mimic the utility of the needle valve 85 of the above paragraph. This embodiment would eliminate the need for a separate air/non-condensable gas discharge pipe and valve.

FIG. 6 illustrates a logic flow chart for a control program 100 running on a means for computing (51, 52, 54). It is within the ordinary skill in the art for a computer programmer to write a program for a computing means based on this flow chart. Control program 100 begins at block 102 where the program variables are initialized. In block 104, the program calibrates the valve position variable to the actual valve position. Typically, the calibration would only be required after the system is first installed or following maintenance or repair of a steam trap 10 component.

Next, the flow enters the control loop 105 at block 106, which may display current valve position on a means for display such as a monitor attached to the PLC 51. The valve position display may not be desired for all installations and is, therefore, optional. Thereafter, the flow moves to block 108 where condensate level in steam trap chamber 24 is checked. Then, the current level is compared to the last level in decision block 110. Additionally, the current level may also be compared to the control band in decision block 110. If the level has changed and/or is out of the control band, then the program flow moves to block 112 where a signal is sent to the discharge valve actuator 67 to reposition discharge valve 61. Once the valve has been repositioned, the program flow moves to block 114, block 122, or loop back to block 106 (assuming that the system does not include an air purge system as is show in FIG. 6).

Blocks 114–120 are optional and would only be employed if the air purge system 80 is included. In block 114 the program reads the input from temperature sensor 82. Thereafter, the program flow moves to decision block 116, where the temperature input is compared to a set value. Typically, this valve represents a temperature of approximately 195° F. If the temperature is less that the set point, then a signal is sent to the air purge valve actuator 87 to open air purge valve 86 as shown in block 118. When the temperature is above the set point, a signal is sent to the air purge valve actuator 87 to close air purge valve 86 per block 120. Thereafter, the program flow may be to block 122.

Block 122 provides an optional time delay, preferably approximately ten seconds. When utilized, this time delay slows the operation of steam trap 10 therefore steam trap 10 tends to be more consistent and exhibit smoother operation.

Figure 5:
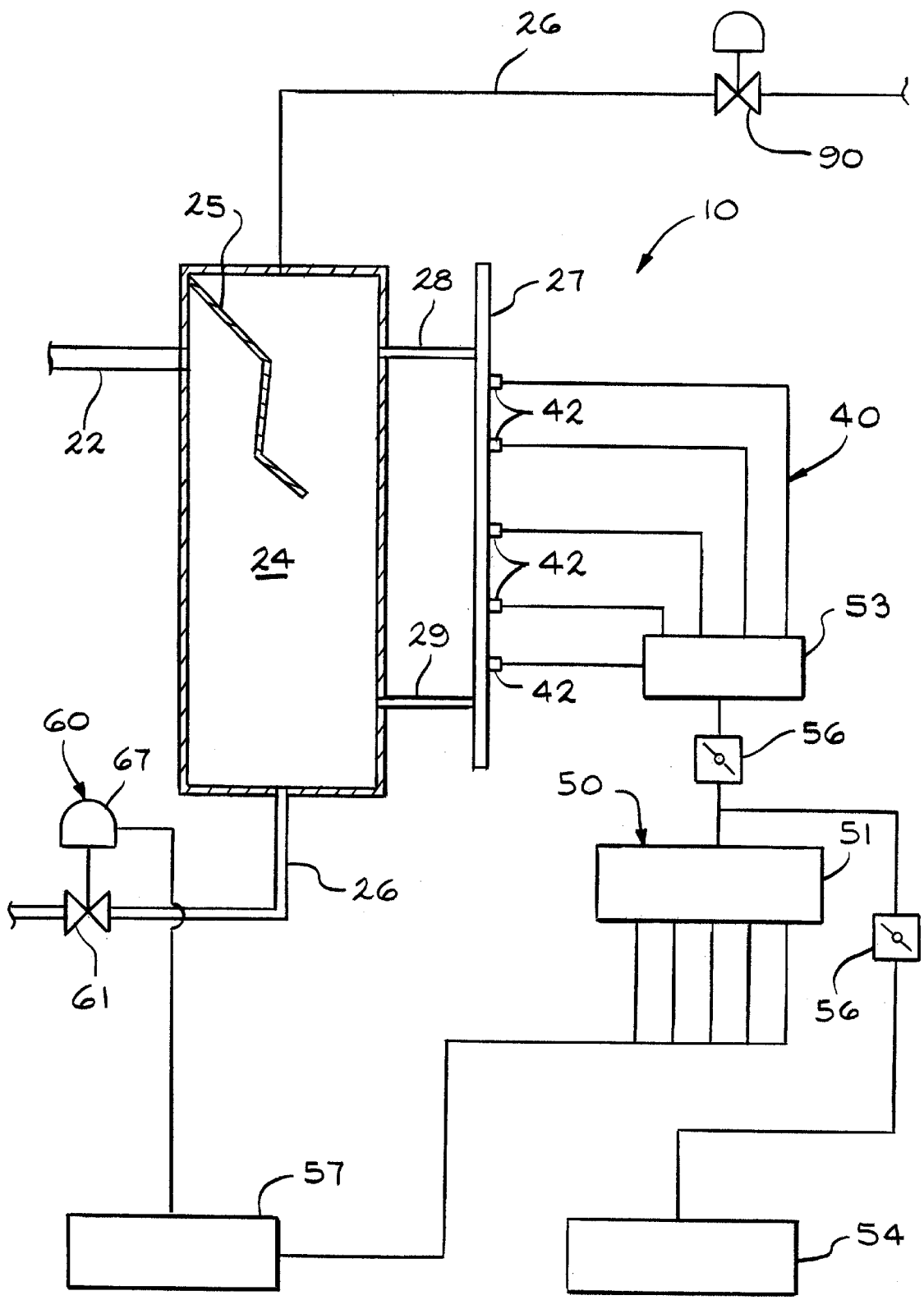
FIG. 5 is a functional diagram of a fifth embodiment of the electronic steam trap shown in FIG. 1 incorporating a flash tank system.

In an alternative embodiment, as illustrated in FIG. 5, the electronic steam trap 10 may further comprise a flash tank system which converts high pressure/temperature condensate into lower pressure/temperature steam for reuse with the steam plant processes. The flash tank system comprises a splash shield 25, a pressure-reducing valve 90, and a steam outlet pipe 26. The splash shield 25 directs the hot condensate to the bottom of the steam trap. This helps prevent carry over of the condensate in the flash steam. A pressure-reducing valve 90 reduces the pressure in the steam trap chamber 24 causing the hot condensate to flash to steam. The steam is conducted away from the steam trap chamber via steam outlet pipe 26. The steam may then be used to power additional processes in the steam plant.

In a preferred embodiment, as illustrated in FIG. 4, the electronic steam trap 10 may be part of a steam trap system which includes a line monitoring system 73. A line monitoring system 73 would consist of at least one pressure/temperature sensor 71 residing on each steam line 70 connected to a common drain pipe 22 to feed condensate into a steam trap chamber 10. Each pressure/temperature sensor would monitor the pressure and temperature of steam/condensate being conducted through its steam pipe. The sensor 71 would send a signal to line monitoring system (not shown). The line monitoring system (not shown) receives, interprets, and responds to input generated by the pressure/temperature sensors 71 attached to the steam pipes 70. If the pressure/temperature level of a particular pipe deviates from predetermined limits, the line monitoring system will actuate an alarm pinpointing which steam pipe is malfunctioning. The actual components and control logic selected for the line monitoring system will depend on the type of sensor(s) 71 used. The design of the particular line monitoring system 73 employed is within the ordinary skill in the art. Preferably, the line monitoring system 73 is connected to the same means for computing used by the condensate level control system.

In summary, numerous benefits have been described which result from employing the concepts of the invention. The foregoing description of an exemplary preferred embodiment to the invention has been presented for the purpose of illustration and description. It is not intended to be exhaustive or to limit the invention to the precise form disclosed. Obvious modifications or variations are possible in light of the above teachings. The embodiment was selected and described in order to best illustrate the principles of the invention and its principal application to hereby enable one of ordinary skill in the art to best utilize the invention in various embodiments and with various modifications as are suited to the particular use contemplated It is intended that the scope of the invention be defined by the claims appended hereto.

What is claimed is:

1. An electronically operated steam trap system, said steam trap system comprising:

a. a steam trap chamber which accumulates condensate therein;

b. a condensate level sensor system, for detecting variations in condensate level within said steam trap chamber, said system comprising a multiplicity of electronic liquid level sensors;

c. a condensate level control system, said condensate level control system in communication with said condensate level whereby said control system receives electronic input signals corresponding to the condensate level in said steam trap chamber, said condensate level control system in communication with a condensate discharge system to send an output signal that modulates the rate of flow of condensate discharged from said steam trap chamber in proportion to the sensed condensate level within said steam trap chamber.

2. The electronically operated steam trap system of claim 1, where said steam trap includes an air purge system.

3. The electronically operated steam trap of claim 2, where said condensate level control system maintains a substantially stable level of condensate within a predetermined level control range in said steam trap.

4. The electronically operated steam trap of claim 3, where said level control system ensures that said condensate discharge valve will be maintained in a substantially steady position and said discharge of condensate will be maintained in a substantially steady flow.

5. The electronically operated steam trap of claim 4, where said condensate level sensor system comprises at least three different condensate level sensors, each of said sensors capable of sensing a different condensate level.

6. The electronically operated steam trap of claim 5, where said condensate level sensor system is located within said steam trap chamber and is protected by a splash shield.

7. The electronically operated steam trap of claim 5, where said condensate level sensor system is located outside of said steam trap chamber.

8. The electronically operated steam trap of claim 5, where said condensate level control system includes a means for computing which receives input regarding the level of condensate present in the steam trap, processes said input, calculates the adjustment necessary to effect a controlled rate of condensate discharge from the steam trap, and communicates with said condensate discharge system to adjust the position of said condensate discharge valve.

9. The electronically operated steam trap of claim 8, where said means for computing receives input regarding the processes to be powered by a steam system utilizing said steam trap system, calculates the future adjustments necessary to effect a controlled rate of condensate discharge from the steam trap, and communicates with said condensate discharge system to proactively adjust the position of said condensate discharge valve.

10. The electronically operated steam trap of claim 4, where said condensate level sensor system includes a high-level and low-level alarm sensor and said alarm sensor triggers an alarm system upon activation.

11. The electronically operated steam trap of claim 2, where said air purge system comprises two air purge valves and a temperature sensor.

12. The electronically operated steam trap of claim 11, where said air purge valves comprise a main air purge valve, where said main air purge valve opens upon startup of a plant to discharge any air contained in said steam trap chamber before any condensate has formed, where said air purge system causes said main air purge valve to shut upon activation of said temperature sensor, and a needle valve where said needle valve remains open at a predetermined level to discharge any accumulated noncondensable gases from within the steam trap chamber during operation of the plant.

13. The electronically operated steam trap of claim 2, where said air purge system comprises at least one air purge throttle valve and a temperature sensor.

14. The electronically operated steam trap of claim 13, where said at least one air purge throttle valve is fully opened upon startup of a plant to discharge any air contained in said steam trap chamber before any condensate has formed, where said air purge system causes said air purge throttle valve to throttle closed until reaching a predetermined level upon activation of said temperature sensor to discharge any accumulated noncondensable gases from within the steam trap chamber during operation of the plant.

15. The electronically operated steam trap system of claim 1, where said steam trap includes a flash tank system.

16. The electronically operated steam trap of claim 15, where said condensate level control system maintains a substantially stable level of condensate within a predetermined level control range in said steam trap.

17. The electronically operated steam trap of claim 16, where said level control system ensures that said condensate discharge valve will be maintained in a substantially steady position and said discharge of condensate will be maintained in a substantially steady flow.

18. The electronically operated steam trap of claim 17, where said condensate level sensor system comprises at least three different condensate level sensors, each of said sensors capable of sensing a different condensate level.

19. The electronically operated steam trap of claim 18, where said condensate level sensor system is located within said steam trap chamber and is protected by a splash shield.

20. The electronically operated steam trap of claim 18, where said condensate level sensor system is located outside of said steam trap chamber.

21. The electronically operated steam trap of claim 18, where said condensate level control system includes a means for computing which receives input regarding the level of condensate present in the steam trap, processes said input, calculates the adjustment necessary to effect a controlled rate of condensate discharge from the steam trap, and communicates with said condensate discharge system to adjust the position of said condensate discharge valve.

22. The electronically operated steam trap of claim 21, where said means for computing receives input regarding the processes to be powered by a steam system utilizing said steam trap system, calculates the future adjustments necessary to effect a controlled rate of condensate discharge from the steam trap, and communicates with said condensate discharge system to proactively adjust the position of said condensate discharge valve.

23. The electronically operated steam trap of claims 17, where said condensate level sensor system includes a high-level and low-level alarm sensor and said alarm sensor triggers an alarm system upon activation.

24. The electronically operated steam trap of claims 15, where said flash tank system comprises
  a. a splash plate which directs condensate into the steam trap chamber; and
  b. a pressure reducing valve which forces said condensate to flash into lower temperature/pressure steam; and
  c. an outlet pipe to conduct said lower temperature/pressure steam to other operations of the plant.

25. The electronically operated steam trap system of claim 1, where said steam trap system includes a line monitoring system.

26. The electronically operated steam trap system of claim 25, where said line monitoring system comprises:
  a. a temperature/pressure sensing device, attached to each steam line which conducts steam/condensate to said steam trap, capable of monitoring the pressure/temperature of each of said steam lines;
  b. a means for computing which receives input from said temperature/pressure sensing devices and compares said input to predetermined limits; and
  c. an alarm system capable of actuating an alarm to identify which of said steam lines is malfunctioning upon receiving a signal from said means for computing.

27. The electronically operated steam trap of claim 1, where said condensate level control system maintains a substantially stable level of condensate within a predetermined level control range in said steam trap.

28. The electronically operated steam trap of claim 27, where said level control system ensures that said condensate discharge valve will be maintained in a substantially steady position and said discharge of condensate will be maintained in a substantially steady flow.

29. The electronically operated steam trap of claim 28, where said condensate level sensor system comprises at least three different condensate level sensors, each of said sensors capable of sensing a different condensate level.

30. The electronically operated steam trap of claim 29, where said condensate level sensor system is located within said steam trap chamber and is protected by a splash shield.

31. The electronically operated steam trap of claim 29, where said condensate level sensor system is located outside of said steam trap chamber.

32. The electronically operated steam trap of claim 29, where said condensate level control system includes a means for computing which receives input regarding the level of condensate present in the steam trap, processes said input, calculates the adjustment necessary to effect a controlled rate of condensate discharge from the steam trap, and communicates with said condensate discharge system to adjust the position of said condensate discharge valve.

33. The electronically operated steam trap of claim 32, where said means for computing receives input regarding the processes to be powered by a steam system utilizing said steam trap system, calculates the future adjustments necessary to effect a controlled rate of condensate discharge from the steam trap, and communicates with said condensate discharge system to proactively adjust the position of said condensate discharge valve.

34. The electronically operated steam trap of claim 28, where said condensate level sensor system includes a high-level and low-level alarm sensor and said alarm sensor triggers an alarm system upon activation.

35. A method of draining condensate from a steam system, which comprises:

a. monitoring the pressure and temperature of steam lines carrying condensate to a steam trap;

b. actuating an alarm if pressure/temperature of said steam lines deviates from predetermined parameters;

c. storing condensate within a steam trap chamber;

d. monitoring the level of said condensate within said steam trap chamber;

e. computing a rate of discharge for said condensate that will maintain a steady level of condensate within said steam trap chamber;

f. adjusting a condensate discharge valve in said steam trap chamber to discharge said condensate according to said rate of discharge necessary to maintain said level of condensate within steam trap chamber;

g. discharging said condensate from said steam trap chamber; and h. actuating an alarm system if said storage or discharge of condensate exceeds preset parameters.

36. The method of claim 35, where said method includes the step of purging air and other noncondensable gases from the steam trap chamber before said step of storing condensate within the steam trap chamber.

37. The method of claim 36, where said method further includes the step of purging air and other noncondensable gases from the steam trap chamber during said step of storing condensate within the steam trap chamber.

38. The method of claim 35, where both said steps of monitoring the level of condensate and said adjusting said condensate discharge valve further includes the steps of (i) using at least one computer system to receive input regarding the steam load and manufacturing processes; (ii) using said at least one computer system to compute anticipated changes in the steam load; and (iii) adjusting said condensate discharge valve to anticipate changes in condensate level.

39. The method of claim 35, where, during said step of discharging condensate, said method further includes the steps of (i) reducing pressure within said steam trap chamber; (ii) allowing said condensate to flash to produce lower pressure/temperature steam within said steam trap chamber as condensate is discharged from said steam trap chamber; (iii) discharging said steam from said steam trap chamber; and (iv) reintroducing said steam into the steam system to provide additional power to processes of the steam system.

* * * * *